(12) United States Patent
Zhao et al.

(10) Patent No.: US 8,662,919 B2
(45) Date of Patent: Mar. 4, 2014

(54) ELECTRONIC DEVICE WITH PORT SHIELD

(75) Inventors: Ting-Ting Zhao, Shenzhen (CN); He-Li Wang, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/477,089

(22) Filed: May 22, 2012

(65) Prior Publication Data

US 2013/0260607 A1    Oct. 3, 2013

(30) Foreign Application Priority Data

Apr. 2, 2012  (CN) .......................... 2012 1 0095503

(51) Int. Cl.
*H01R 13/73*    (2006.01)

(52) U.S. Cl.
USPC .................... 439/540.1; 361/818; 439/607.25

(58) Field of Classification Search
USPC ............ 439/607.23, 607.24, 607.25, 607.27, 439/607.46, 607.1, 76.1, 540.1; 361/816–818
See application file for complete search history.

(56) References Cited

U.S. PATENT DOCUMENTS

| | | | |
|---|---|---|---|
| 4,215,236 A * | 7/1980 | Reiser ....................... 439/540.1 |
| 5,547,397 A * | 8/1996 | Hirai ........................ 439/607.01 |
| 5,639,267 A * | 6/1997 | Loudermilk .................. 439/701 |
| 5,951,317 A * | 9/1999 | Tracy et al. .................... 439/352 |
| 6,537,085 B2 * | 3/2003 | Na ................................ 439/76.1 |
| 7,059,915 B1 * | 6/2006 | Schempp et al. ............. 439/676 |
| 7,118,414 B2 * | 10/2006 | Spears et al. ............... 439/540.1 |
| 7,200,002 B2 * | 4/2007 | Peng et al. .................... 439/76.1 |
| 7,315,444 B2 * | 1/2008 | Chen et al. ................ 361/679.55 |
| 7,806,701 B2 * | 10/2010 | Tochi et al. ................... 439/76.1 |
| 7,909,643 B2 * | 3/2011 | Pepe et al. ................. 439/540.1 |
| 8,027,167 B2 * | 9/2011 | Liu ................................ 361/752 |
| 8,277,251 B2 * | 10/2012 | Liu et al. .................. 439/607.04 |
| 8,282,414 B2 * | 10/2012 | Zhou et al. ................. 439/541.5 |
| 2006/0223365 A1 * | 10/2006 | Campbell .................. 439/540.1 |
| 2006/0246866 A1 * | 11/2006 | Nakagawa et al. ........... 455/301 |
| 2008/0106884 A1 * | 5/2008 | English et al. ................ 361/818 |
| 2008/0124952 A1 * | 5/2008 | Wan et al. ........................ 439/65 |
| 2009/0269977 A1 * | 10/2009 | Chen et al. ................. 439/540.1 |
| 2010/0075544 A1 * | 3/2010 | Liu et al. ....................... 439/701 |
| 2012/0077386 A1 * | 3/2012 | Shu et al. ...................... 439/629 |
| 2012/0129397 A1 * | 5/2012 | Chen ........................ 439/607.24 |

* cited by examiner

*Primary Examiner* — Briggitte R Hammond
(74) *Attorney, Agent, or Firm* — Altis Law Group, Inc.

(57) ABSTRACT

An electronic device includes a housing, a circuit board accommodated in the housing, a number of I/O ports mounted on the circuit board, and a port shield secured to the housing. The housing defines a number of openings, and the I/O ports are exposed from the plurality of openings. The port shield defines a number of receiving spaces to receive and position the I/O ports, thereby preventing the plurality of I/O ports from becoming loose and detaching from the circuit board.

3 Claims, 5 Drawing Sheets

ELECTRONIC DEVICE WITH PORT SHIELD

BACKGROUND

1. Technical Field

The present disclosure relates to an electronic device having a port shield for positioning I/O (input/output) ports thereof

2. Description of Related Art

Electronic devices, such as multi-media players, may include I/O ports for connecting with microphones, earphones, and/or universal serial bus (USB) devices. Such an electronic device includes a circuit board for mounting the I/O ports thereon. After being used for many times, the I/O ports may become loose or even detached from the circuit board.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure are described with reference to the accompanying drawings.

Figure 1:
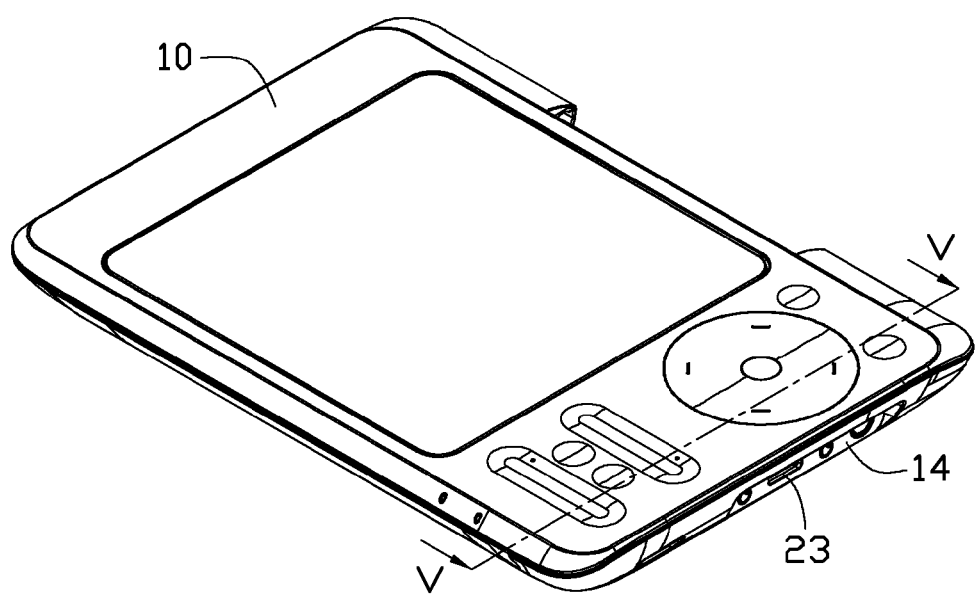
FIG. 1 is an isometric view of an electronic device with a port shield for securing I/O ports in accordance to an exemplary embodiment.
Figure 2:
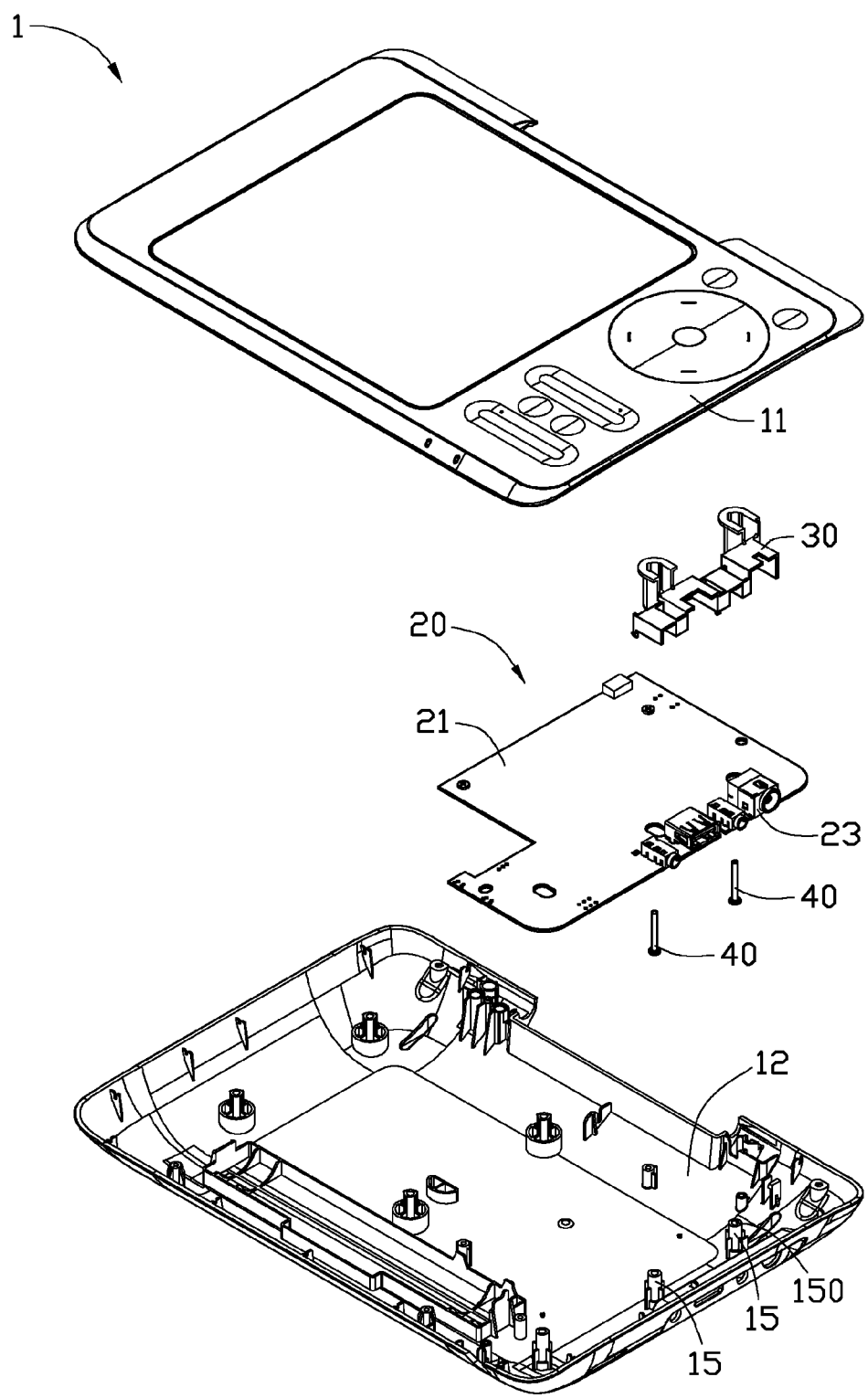
FIG. 2 is an exploded, isometric view of the electronic device of FIG. 1.
Figure 3:
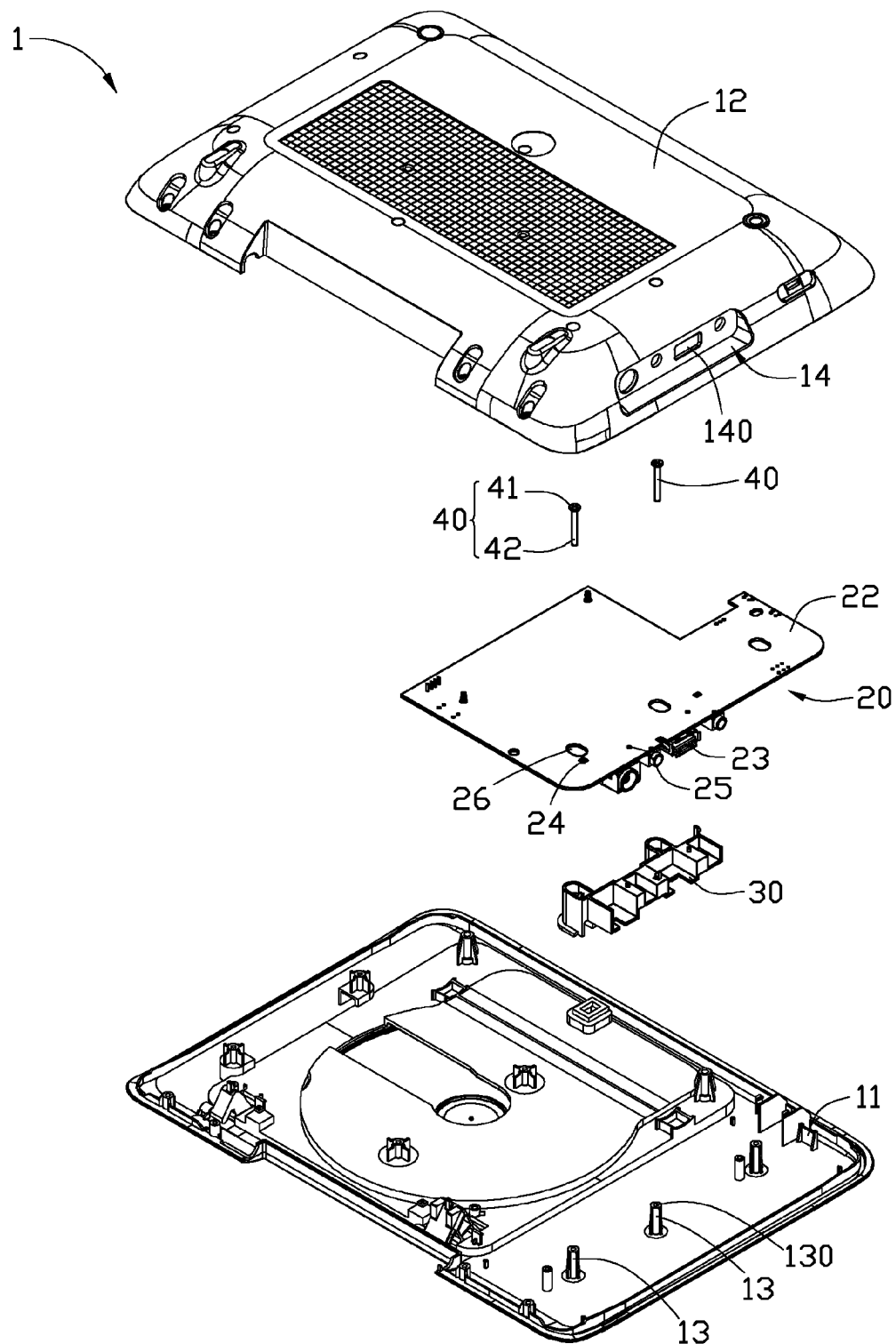
FIG. 3 is an exploded, isometric view of the electronic device of FIG. 1, but viewed from a reverse perspective.

Referring to FIGS. 1-3, an electronic device 1 in accordance with an exemplary embodiment is illustrated. The electronic device 1 includes a housing 10, a circuit board 20 accommodated in the housing 10, a port shield 30, and two fasteners 40 securing the port shield 30 to the housing 10. The circuit board 20 includes a number of I/O ports 23 mounted thereon. In the embodiment, the electronic device 1 is an multi-media player, and the I/O ports 23 include four ports for respectively connecting with a microphone, an earphone, a universal serial bus (USB) device, and a power device.

The housing 10 includes a cover 11 and a base 12 coupled with the cover 11. Two first positioning posts 13 protrude from the cover 11 toward the base 12, and each defines a first positioning hole 130. Two second positioning posts 15 protrude from the base 12 toward the cover 11, and each defines a second positioning hole 150 substantially aligned with the first positioning hole 130. The second positioning hole 150 is a stepped through hole. The base 12 defines a recess 14 in one side and a number of openings 140 in the recess 14 for exposing the I/O ports 23. Thus, the I/O ports 23 are accessible through the openings 140 from an exterior of the electronic device 1.

The circuit board 20 includes a first surface 21 facing the cover 11 and an opposite, second surface 22. The I/O ports 23 are mounted on the first surface 21. The circuit board 20 defines three latching holes 24, two positioning holes 25, and two through holes 26. The latching holes 24, the positioning holes 25, and the through holes 26 extend through both of the first surface 21 and the second surface 22.

Figure 4:
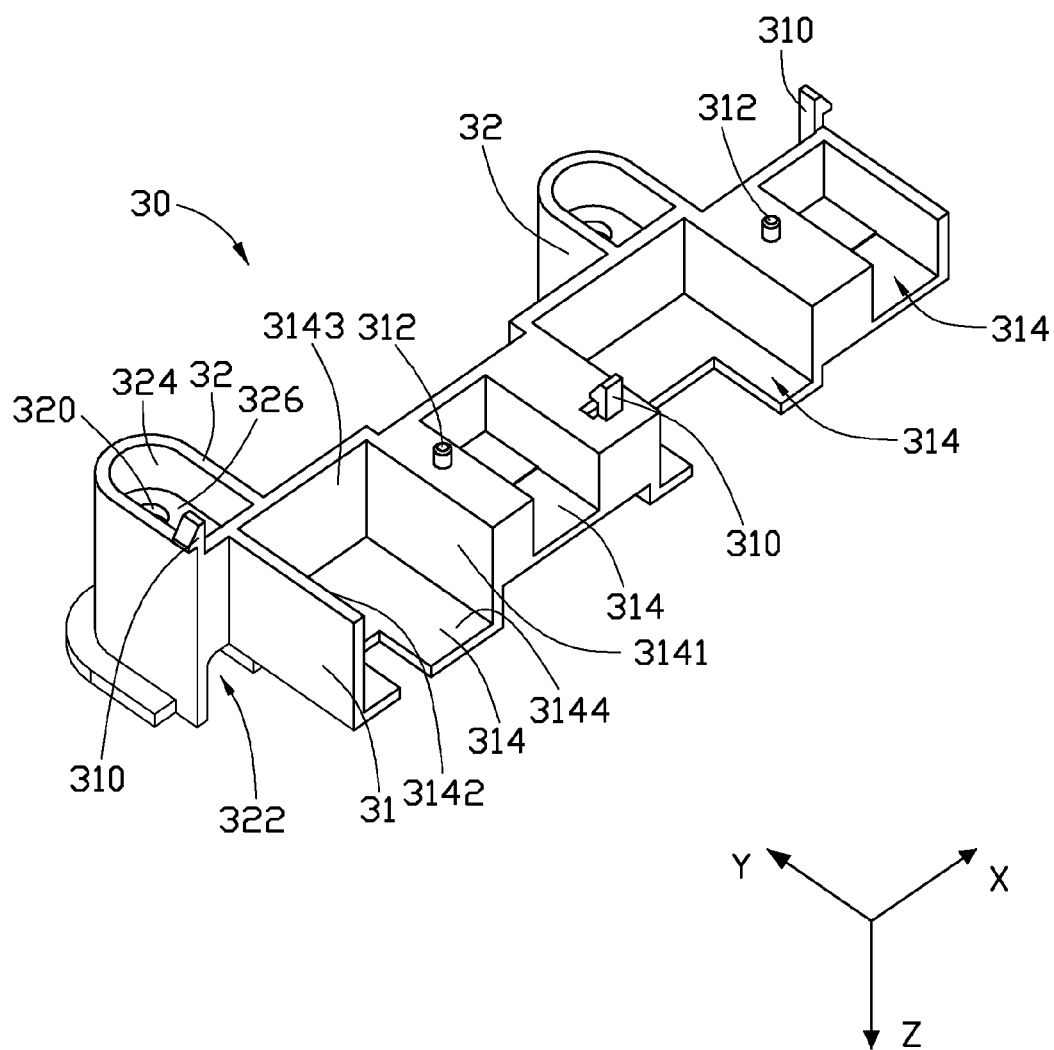
FIG. 4 is an isometric view of the port shield of FIG. 1.

Referring also to FIG. 4, the port shield 30 includes a main body 31 and two fastening portions 32 located at one side of the main body 31. The main body 31 includes two hooks 310 and two positioning posts 312, and defines a number of isolated receiving spaces 314 corresponding to the I/O ports 23 for respectively receiving and fixing a corresponding one of the I/O ports 23 therein. After assembling the port shield 30 to the circuit board 20, the positioning posts 312 are fitted in the positioning holes 25, and the hooks 310 latch with the latching holes 25. Then the I/O ports 23 are housed in the receiving spaces 314 of the port shield 30. Each receiving space 314 includes a first inner side 3141, a second inner side 3142 parallel to the first inner side 3141, a third inner side 3143 connecting the first inner side 3141 and the second inner side 3142, and a top 3144 connecting the first inner side 3141 and the second inner side 3142. The first inner side 3141 and the second inner side 3142 prevent the corresponding one of the I/O ports 23 from becoming loose in a first direction X parallel to the circuit board 20. The third inner side 3143 prevents the corresponding one of the I/O ports 23 from becoming loose in a second direction Y parallel to the circuit board 20. The top 3144 prevents the corresponding one of the I/O ports 23 from becoming loose in the third direction Z perpendicular to the circuit board 20.

Figure 5:
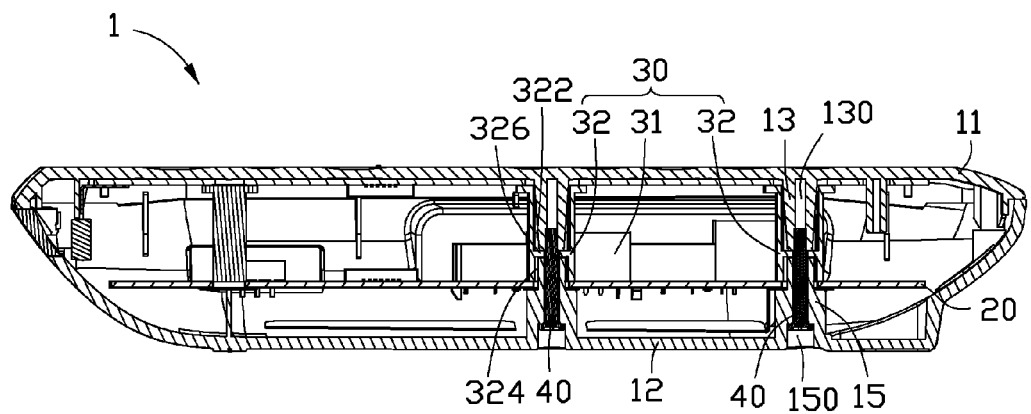
FIG. 5 is a cross sectional view of the electronic device, taken along line V-V of FIG. 1.

Referring also to FIG. 5, each fastening portion 32 defines a first cavity 322 retaining a distal end of the first positioning post 13 and a second cavity 324 retaining a distal end of the second positioning post 15. The fastening portion 32 further includes a middle plate 326 between the first cavity 322 and the second cavity 324. The middle plate 326 defines a guide hole 320 communicating with both the first cavity 322 and the second cavity 324. A diameter of the guide hole 320 is less than that of the first positioning post 13 and the second positioning posts 15.

The fastener 40 includes a head 41 and a shank 42 connected to the shank 41. The diameter of the shank 32 is less than the diameter of the shank 31.

In assembly, the shank 42 of the fastener 40 extends in sequence through the second positioning hole 150 of the base 12 and the guide hole 320, till being screwed into the first positioning hole 130, which secures the port shield 30 to the cover 11. Thus, I/O ports 23 are positioned within the receiving spaces 314 of the port shield 30, thereby preventing the I/O ports 23 from becoming loose and detaching from the circuit board 20.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. An electronic device comprising:
   a housing comprising a cover and a base coupled with the cover;
   the base comprising at least one second positioning post, each of the at least one second positioning post defining a second positioning hole, and the base defining a recess in one side;
   the cover comprising at least one first positioning post, each of the at least one first positioning post defining a first positioning hole; and
   the housing defining a plurality of openings formed in the recess;

a circuit board accommodated in the housing;

a plurality of I/O ports mounted on the circuit board and exposed from the plurality of openings;

a port shield comprising a main body and at least one fastening portion located at one side of the main body and fastened to the housing;

the main body defining a plurality of isolated receiving spaces corresponding to the plurality of I/O ports and respectively to receive and fix a corresponding one of the plurality of I/O ports therein, thereby preventing the plurality of I/O ports from becoming loose and detached from the circuit board; and each of the at least fastening portion defining a first cavity retaining a distal end of the at least one first positioning post, a second cavity retaining a distal end of the at least one second positioning post, and a guide hole communicating with the first cavity and the second cavity; and at least one fastener that extends through the second positioning hole of the at least one second positioning post, the circuit board and the port shield till being screwed into the first positioning hole of the at least one first positioning post, thereby securing the port shield to the cover.

2. The electronic device as described in claim 1, wherein each of the at least one fastening portion comprises a middle plate between the first cavity and the second cavity and defining the guide hole, and a diameter of the guide hole is less than that of the at least one first positioning post and the at least one second positioning post.

3. An electronic device comprising:

a housing defining a plurality of openings;

a circuit board accommodated in the housing;

a plurality of I/O ports mounted on the circuit board and exposed from the plurality of openings; and a port shield comprising a main body and at least one fastening portion located at one side of the main body and fastened to the housing, the main body defining a plurality of isolated receiving spaces corresponding to the plurality of I/O ports and respectively to receive and fix a corresponding one of the plurality of I/O ports therein, thereby preventing the plurality of I/O ports from becoming loose and detached from the circuit board;

wherein the circuit board defines a plurality of latching holes and a plurality of positioning holes, and the main body comprises a plurality of hooks each latching with one of the plurality of latching holes and a plurality of positioning posts each retained within one of the plurality of positioning holes.

* * * * *